United States Patent
Lim et al.

(10) Patent No.: US 9,572,170 B2
(45) Date of Patent: Feb. 14, 2017

(54) METHOD AND DEVICE FOR APPLYING ADAPTIVE LINK IN COMMUNICATION SYSTEM

(75) Inventors: Jun Sung Lim, Seoul (KR); Hi Chan Moon, Yongin-si (KR); Chae Man Lim, Seoul (KR); Jin Ho Kim, Seoul (KR); Jung Su Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 13/636,546

(22) PCT Filed: Mar. 22, 2011

(86) PCT No.: PCT/KR2011/001949
§ 371 (c)(1),
(2), (4) Date: Sep. 21, 2012

(87) PCT Pub. No.: WO2011/118956
PCT Pub. Date: Sep. 29, 2011

(65) Prior Publication Data
US 2013/0010634 A1    Jan. 10, 2013

(30) Foreign Application Priority Data

Mar. 22, 2010 (KR) .................. 10-2010-0025493
Apr. 5, 2010 (KR) .................. 10-2010-0031050

(51) Int. Cl.
*H04W 72/08* (2009.01)
*H04L 1/00* (2006.01)
(Continued)

(52) U.S. Cl.
CPC ............ *H04W 72/085* (2013.01); *H04L 1/003* (2013.01); *H04L 1/0026* (2013.01); *H04L 5/006* (2013.01);
(Continued)

(58) Field of Classification Search
None
See application file for complete search history.

(56) References Cited

U.S. PATENT DOCUMENTS 7,239,847 B2    7/2007 Attar et al.
2007/0183335 A1    8/2007 Pietraski et al.
(Continued)

FOREIGN PATENT DOCUMENTS

KR    10-2007-0001417 A    1/2007
KR    10-2009-0007129 A    1/2009

OTHER PUBLICATIONS

"CQI Enhancement for Interference Varying Environments", 3GPP TSG RAN WG1 Meeting #60, R1-101061, Feb. 22, 2009, San Francisco, USA.

*Primary Examiner* — Wei Zhao
*Assistant Examiner* — Ronald H Davis
(74) *Attorney, Agent, or Firm* — Jefferson IP Law, LLP (57) ABSTRACT

Provided are a method and an apparatus of transceiving a signal using a link adaptation in a communication system, particularly, a method of dividing a resource region into a plurality of resource regions, and applying different line adaptations to the resource regions. A method of controlling a link of a terminal in a mobile communication system receives at least two downlink channel signals to estimate states of received channels, generates a channel discrepancy report when states of channels exceed a preset threshold, and reports the channel discrepancy report to a base station through a preset uplink channel. A method of controlling a link of a base station receives a channel discrepancy report through an uplink channel, and determines MCS and transmission power of downlink channels based on the received channel discrepancy report and transmits the determined MCS and transmission power to the terminal through a downlink channel.

19 Claims, 7 Drawing Sheets

(51) Int. Cl.
*H04L 5/00* (2006.01)
*H04W 72/04* (2009.01)

(52) U.S. Cl.
CPC .......... *H04L 5/0046* (2013.01); *H04L 1/0003* (2013.01); *H04L 1/0009* (2013.01); *H04W 72/0413* (2013.01)

(56) References Cited

U.S. PATENT DOCUMENTS

2010/0165847 A1* 7/2010 Kamuf et al. ................ 370/241
2010/0322097 A1* 12/2010 Jen ................................ 370/252
2013/0301422 A1* 11/2013 Caretti et al. ................ 370/241

* cited by examiner

METHOD AND DEVICE FOR APPLYING ADAPTIVE LINK IN COMMUNICATION SYSTEM

BACKGROUND OF THE INVENTION

Field of the Invention

The present invention relates to a method and an apparatus of transceiving a signal using a link adaptation in a communication system.

Description of the Related Art

A next generation communication system has been developed to the form of a mobile communication system for providing services capable of transceiving high speed large capacity data to a mobile station (hereinafter referred to as 'MS').

The most basic problem of the next generation communication system is how efficiently and reliably data can be transmitted through a channel. Accordingly, it is essential to increase efficiency of a system using transmission power suitable in a system channel environment or a Modulation and Coding Scheme (hereinafter referred to as 'MCS'). An efficient communication link may be collectively operated without consuming a system resource by suitably controlling transmission power of a transmission channel.

To apply such a link adaptation, a base station (BS) must estimate link quality of a data transmission channel. In this case, the BS includes various types such as Femto cell, Pico cell, Relay node as well as a general base station. Accordingly, in a case of downlink, the MS measures link quality of a signal received from the BS, and reports the measured link quality of the received signal to the BS.

Meanwhile, a wireless resource for transmitting data is divided into a plurality of regions, and a method of transmitting data of different applications or the same application but different types is applied to each region. In this case, when transmitting data to each region, each region may apply different transmission power or MCS levels. An LTE downlink is described as one embodiment. One subframe is divided into a PDCCH transmission region for transmitting scheduling relation information and other control information and a PDSCH region for transmitting general data. The BS may change transmission power and an MCS used for transmitting PDCCH data and PDSCH data. Control information transmitted to the MS is transmitted to the PDCCH region, and user data are transmitted to the PDSCH region.

An MS in a current communication system reports a Channel quality indicator (CQI) representing link quality with respect to entire or specific resource regions to the BS. The BS determines transmission power of each resource region and an MCS based on this. Data to be transmitted to each region or robust or loose transmission power according to a transmission scheme are applied to the MCS.

Figure 1:
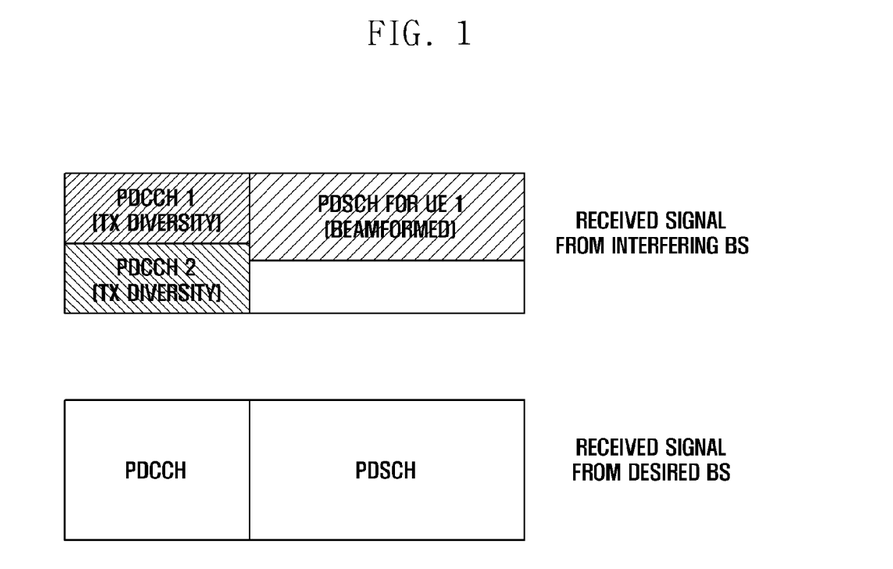
FIG. 1 is a diagram illustrating interference (PDCCH vs PDSCH) by regions in a communication system according to the related art.

However, link quality of respective regions may be different from each other. This may occur due to very many reasons, and a representative reason is as follows. FIG. 1 is a diagram illustrating interference (PDCCH vs PDSCH) by regions in a communication system according to the related art.

First, a case where interference amounts are different for each region is described. For example, it is assumed that transmission timing of BSs is synchronous, and the transmission resource is a system obtained by time-multiplexing a resource for transmitting control information in one subframe and a resource for transmitting data information. In this case, when an MIMO mode transmitted to each region is different, statistics of interference received by each region are different from each other, so link quality is changed. Second, a case where loading is different for each regions will be described. As shown in FIG. 1, when a frequency use loading of a PDSCH region is different from a frequency use loading of a PDCCH, interference statistics are different for each region. Third, there is a case where different transmit powers are applied for each region. Fourth, there is a case where different fadings occur for each region.

Accordingly, an exact link adaptation cannot be applied by only link quality CQI information with respect to total or specific resource regions in the same as in a current communication scheme. Due to this, data reception of each region is not easily achieved or transmission power or resource is inefficiently operated. In particular, when transmission power of control information or an MCS associated with scheduling is wrongly selected, because resource allocation information for transceiving data cannot be received, transmission efficiency is significantly deteriorated and an abnormal operation is induced so that communication become impossible.

An LTE system according to the related art is designed on the assumption that a channel state of a control information region (PDCCH region) is the same as a channel state of a data channel region (PDSCH region) (signal-to noise ratio received when transmitting the same power). Accordingly, regardless of a performance of each region, a channel state in one subframe is measured and the measured channel state is transmitted to a base station with CQI. Accordingly, a CQI in the LTE system according to the related art indicates an average channel state without discriminating the region. In this case, a channel transmitting the CQI uses the PUCCH. Such CQI report is periodically transmitted in a preset time.

A base station (BS) having received the information determines an amount, an MCS, and transmission power of a data channel (PDSCH) to be transmitted to a downlink based on the CQI. The BS is used to determine the MCS and transmission power of data to be transmitted to the PDCCH being control information. However, as described above, if a channel state of the data transmission region is different from a channel state of the control information transmission region, there may be a problem that MCS levels and transmission power of two channels must be determined by one measured value.

SUMMARY OF THE INVENTION

The present invention has been made in view of the above problems, and provides a method capable of efficiently transmitting data by applying a line adaptation, a link quality feedback scheme of an MS for efficient application, and a line adaptation by regions using this.

The present invention further provides a method which measures channel states by regions and reports the measured channel states to a BS by an MS when channel states by regions are different from each other, and determines an efficient MCS level and a transmission power level based on the measured channel states by the BS.

The present invention further provides a method of minimizing an amount of a resource of a reverse link necessary for the report when an MS measures and reports channel information by regions.

In accordance with an aspect of the present invention, a method of controlling link adaptation of a terminal in a mobile communication system, includes: measuring channel states of a first region and a second region of downlink, respectively; analyzing the measured channel state information of the first region and the second region to determine whether a channel discrepancy report occurs; and generating the channel discrepancy report when the channel discrepancy report occurs, and transmitting channel state information including the channel discrepancy report to a base station through a preset uplink channel.

In accordance with another aspect of the present invention, a method of controlling link adaptation of a terminal in a mobile communication system, includes: receiving channel state information from a terminal; analyzing a channel discrepancy report and compensating for a channel discrepancy value to determine downlink quality of a first region and a second region when the channel discrepancy report is included in the received channel state information; and controlling transmission of a downlink channel corresponding to the determined downlink quality of the first region and the second region.

In accordance with still another aspect of the present invention, an apparatus of controlling link adaptation of a terminal in a mobile communication system, includes: a first channel state estimator measuring a channel state of a first region in downlink; a second channel state estimator measuring a channel state of a second region in the downlink; a controller analyzing the measured channel state information of the first region and the second region to determine whether a channel discrepancy report occurs, and generating the channel discrepancy report when the channel discrepancy report occurs; and a transmitter transmitting channel state information including the channel discrepancy report to a base station through a preset uplink channel.

In accordance with yet another aspect of the present invention, an apparatus of controlling link adaptation of a base station in a mobile communication system, includes: a downlink receiver receiving channel state information from a terminal; a controller analyzing a channel discrepancy report and compensating for a channel discrepancy value to determine downlink quality of a first region and a second region when a channel discrepancy report is included in the received channel state information; and a downlink transmitter controlling transmission of a corresponding downlink channel according to the determined downlink quality of the first region and the second region.

The adaptive link application method according to an embodiment of the present invention can apply an efficient line adaption to improve data transmission efficiency and suppress an abnormal operation of the system. Further, when a channel state of a control information part is different from a channel state of a data part, efficient channel feedback and link adaption are possible, and channel information of the control information part and the data part can be feedback with a low overhead.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention suggests a method which divides a resource region into a plurality of resource regions using link adaptation and applying different link adaptations to the resource regions in a communication system. The present invention periodically or aperiodically reports link quality CQ A of a total or specific resources, measures link quality CQ B of another resource, compares the link quality CQ B with the link quality CQ A, and reports the comparison result to the BS when a difference between the link quality CQ B with the link quality CQ A is great by the MS. Line adaptation of respective resource regions is applied through the link quality report. The BS determines MCS and/or transmission power of corresponding regions (or channels) based on difference information of link quality of the regions and transmits the determined MCS and/or transmission power of corresponding regions to the MS.

The following description will be made on the assumption that the mobile communication system is an LTE mobile communication system, and regions measuring link quality are two regions. Hereinafter, the region may be a channel or a part of the channel. The following description will be made on the assumption that the region refers to a channel, and terms may be used together with each other. That is, a control region and a data region may be used as a control channel and a data channel, respectively. The term 'channel state' may be uses as the same meaning as link quality. CQI-A, CQI A, CQ-A, CQ A (CQI-B, CQI B, CQ-B, CQ B) may be used as the same meaning. In the embodiment of the present invention, a channel discrepancy report and a channel discrepancy message may be used as the same meaning.

Figure 2:
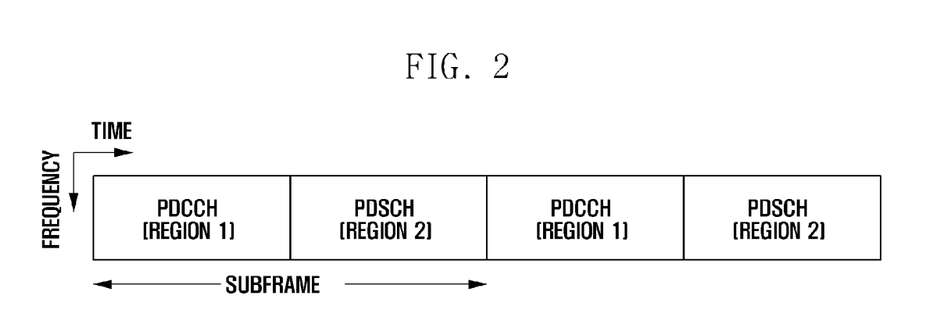
FIG. 2 is a diagram illustrating a subframe & region according to an embodiment of the present invention when a mobile communication system is an LTE system.

A wireless resource in the LTE mobile communication system is divided into subframes, and each subframe is divided into a plurality of resource regions. FIG. 2 is a diagram illustrating subframe & region according to an embodiment of the present invention when a mobile communication system is an LTE system. In the embodiment of the present invention, a first region and a second region are different resource regions, and an MS compares link quality of total or specific resource regions and transmits the comparison result. In the embodiment of the present invention, for convenience of a description, it is assumed that a total region is divided into two regions which includes a region for transmitting control information and a region for transmitting data. The control information transmission region refers to a first region, and the data transmission region refers to a second region. A first region in a case of downlink in an LTE system may be a PDCCH region, and a second region may be a PDSCH region.

An MS according to the embodiment of the present invention suggests measurement of link quality as follows.

The MS measures link quality CQ B with respect to a total (first region+second region) or the second resource region. The MS periodically or aperiodically reports CQI B to the BS using the measured link quality CQ B. The MS measures link quality CQ A with respect to the first region to monitor a difference between CQ A and CQ B.

There are a plurality of methods of measuring link quality by the MS according to a system. An easiest method of measuring link quality, namely, a channel state uses a commonly transmitted reference signal RS. In the LTE system, the RS always transmits the same power to a determined location. The MS may measure amplitude of a received signal based on the RS and measure an interference amount to measure link quality. In this case, various method of measuring the interference amount are possible. A representative used method may use total power received from an OFDM symbol transmitted from the RS. The representative used method may use a value obtained by subtracting received power of the RS from the total power. In recent LTE-A standard, introduction of Channel state information-RS (CSI-RS) is determined for measuring a channel state. A channel state (namely, link quality) may be measured based on the CSI-RS. If using the CSI-RS, a channel state (namely, link quality) with respect to a second region, namely, a region to which data are transmitted in the LTE system may be easily measured. When obtaining a difference between channels states of two regions, an average of interference and noise received in the two regions may be calculated and a difference therebetween may be reported. However, the embodiment of the present invention is applicable regardless of a method of measuring link quality in a specific region.

In the present invention, the MS suggests a scheme of transmitting two types of channel state information (link quality). That is, the MS measures a channel state of a first region (region to which control information is transmitted) and a channel state of a second region (region to which data are transmitted) and reports the channels states of the first and second regions to the BS as channel state information. The BS determines and transmits MCS and/or transmission power of a control channel and a data channel based on the two channel state information.

The embodiment of the present invention is described with reference to an embodiment which measures and reports a channel state of a control channel and a channel state of a data region by the MS. However, the MS measures and reports a channel state of a control channel region and a channel state of a total region to the BS. The BS calculates channel states of a control information region and a data region based on the channel state report and determines and transmits MCS and/or transmission power of downlink. it will become apparent to those skilled in the art that such modification is an equivalent method. An embodiment of measuring and reporting a channel state of a control information region and a channel state of a data region described in the embodiment of the present invention is applicable to a method of measuring and reporting a channel state with respect to at least two regions in which can be modified. The present invention may be implemented by dividing different resources into a plurality of regions (3 or more regions). Accordingly, an overview the embodiment of the present invention will be given based on a method for measuring channel states of the control information region and the data region and reporting the measured channel states of the control information region and the data region to the BS.

Figure 3:
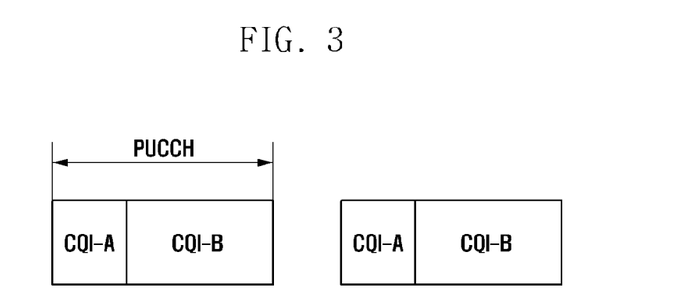
FIG. 3 is a diagram illustrating an example of reporting CQI information by regions measured by an MS to a BS.

In the embodiment of the present invention, the MS measures and transmits channel states of a data region (second region) and a control information region (first region). In this case, the information of the channel state measured by the MS and a channel transmitted to the BS may be a PUCCH being a reverse control channel in a case of an LTE system. FIG. 3 is a diagram illustrating an example of transmitting channel state information of respective regions measured by the MS to the BS according to the embodiment of the present invention. The embodiment of FIG. 3 divides transmission data of a PUCCH and transmits channel state information of a data region and transmits channel state information of the data region and channel state information of the control region every PUCCH. That is, channel state information of the first region and the second region are transmitted to data to be transmitted to the PUCCH. In this case, to prevent excessive transmission information amount of PUCCH, different CQI transmission bits with respect to the first region and the second region may be transmitted.

In FIG. 3, CQI-A refers to channel state information of the control region, and CQI-B refers to channel state information of the data region. However, a channel state of the control region and a channel state of the data region are not rapidly changed. It is necessary to increase reliability of the channel state of the data region than the channel state of the control region. That is, since a transmission amount of the control information is less than a transmission amount of the data, feedback transmission of the channel state information of the control region more than need may not increase great efficiency of the system. Accordingly, an embodiment of the present invention suggests a method of channel state information of the control region at speed lower than speed of channel state information of the data region.

Figure 4A:
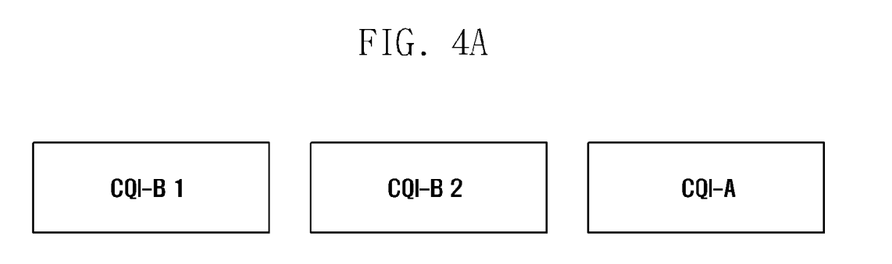
FIGS. 4a to 4c are diagrams illustrating an example of a method of reporting CQI measured by regions to the BS by the MS, which is an example of a method of transmitting channel information of a control region slower (with low frequency) than channel information of a data region according to an embodiment of the present invention.
Figure 4B:
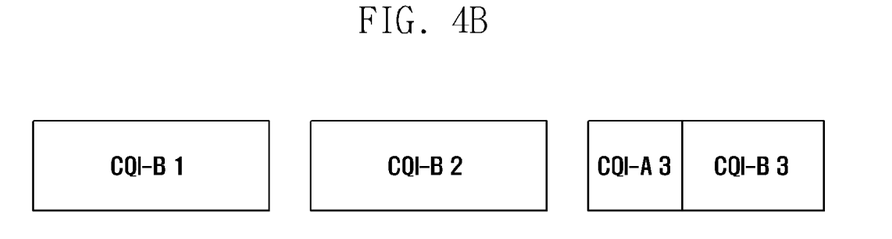
Figure 4C:
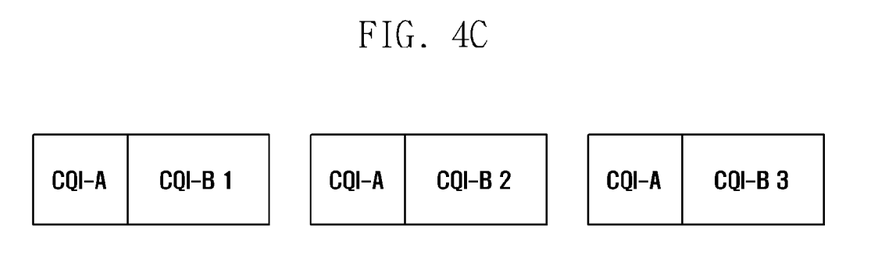

FIGS. 4a to 4c are diagrams illustrating an example of a method of reporting CQI measured by regions to the BS by the MS, which is an example of a method of transmitting channel information of a control region slower (with low frequency) than channel information of a data region according to an embodiment of the present invention.

FIG. 4a illustrates a structure which inserts channel state information of the data region in a plurality of subframes in subframes of a PUCCH being a reverse channel and transmits the inserted subframes, and inserts channel state information of the control region into a relatively small partially subframe and transmits the inserted subframe. The embodiment of FIG. 4a illustrates a case where channel state information of the data region is inserted into two continuous subframes in every three subframes, and channel state information of the control region is inserted into one subframe. The embodiment of FIG. 4a illustrates a case where channel state information of a control region is transmitted every three subframes, and channel state information of the data channel (or channel information of one subframe regardless of control region or data region) is transmitted to remaining subframes, but it may extend to N periods. That is, channel information of the data channel is transmitted every subframe of N subframes, and channel information of the control channel is transmitted to one subframe instead of transmitting channel information of the data channel. In this case, the channel information of the data channel and the channel information of the control channel may be set to have the same bit number.

An overview of an operation of a case where channel state information CQI-A of a first region is transmitted to a final subframe during N subframe periods in an LTE system will be given with reference to FIG. 4a. Channel state information CQI-B (average channel state information of first region and second region) is firstly transmitted to N−1 subframes as in the LTE system. The MS inserts channel state information CQI-A of the first region into a final subframe of periods of N subframes and transmits the inserted final subframe. In this case, a channel transmitting each channel information may be equally used in a CQI transmission location through the PUCCH. Accordingly, the bit number of CQI-A of a first region to be transmitted to an N-th subframe may be the same as the bit number to be transmitted to a second region CQI-B. With respect to such a scheme, a BS receiver firstly recognizes and receives CQI-B to be transmitted to N−1 subframes as channel state information with respect to a second region (data region) to perform transmission power and/or MAC control with respect to PDSCH. The BS receiver recognizes and receives a CQI-A to be transmitted to a final N-th subframe as channel state information with respect to a first region (control information region). The BS receiver performs MCS and/or transmission power control with respect to a channel to be transmitted to a first region (control information region) based on channel state information with respect to the first region. The BS receiver may perform performs MCS and/or transmission power control with respect to channel state information with a second region to be transmitted with a higher period of MCS and transmission power control with respect to the first region.

An embodiment of FIG. 4b illustrates another embodiment where channel state information of a control region is transmitted at speed lower than that of the channel state of the data region. What is different from FIG. 4a is that CQI-B of a data region is transmitted to all subframes. Channel state information of a control channel and channel state information of a data channel are simultaneously transmitted to one subframe in a third subframe to which channel state information of the control channel is transmitted. In a third subframe to be transmitted together with channel state information of a control channel and a data channel in the embodiment of FIG. 4b, a method of transmitting CQI-A and CQI-B being channel state information uses a CQI transmission format at it is, reduces the bit number allocated for channel state information of the data region, and allocates and uses the bit number to channel state information of a control region. Accordingly, the bit number to be transmitted to all subframes may be the same.

FIG. 4c illustrates another embodiment of transmitting channel state information. A case of FIG. 4b has a disadvantage in that a third subframe is transmitted in the form different from that of other subframes. An embodiment of FIG. 4c illustrates a method which transmits channel state information of the channels in the same form, transmits channel state information of a control channel through a plurality of subframes to transmit channel state information of the control channel with a low frequency. The bit number of a CQI designed in the embodiment of FIG. 4c is reduced by 1-2 bit and the reduced bit number may be used for transmission of channel state information of a control region. The bit number to be transmitted to all the subframes may be implemented to be the same. Embodiments of FIGS. 4a to 4c illustrate on the assumption that a transmission length of channel state information of one control channel is three subframes. However, a length transmitting information of a control channel may extend to an optional length.

Embodiments of FIGS. 4a to 4c represent methods of transmitting channel state information of a control channel with a frequency lower than that of channel state information of the data channel. However, conversely, the channel state information of the data channel may be transmitted with a frequency lower than that of the channel state information of the control channel, and a transmission location of the channel state information may be changed and transmitted. In the embodiment of FIGS. 4a to 4c, a period of measuring a channel state of a control channel and a period of measuring a channel state of the data channel are distinctly applicable. For example, although a channel state during a data channel period is measured for each subframe, a channel state during a control channel period can be measured in units of N subframes. That is, an average for a time relatively longer than a time of measuring a channel state of the data channel is applicable to measurement of a channel state of a control channel.

Figure 5A:
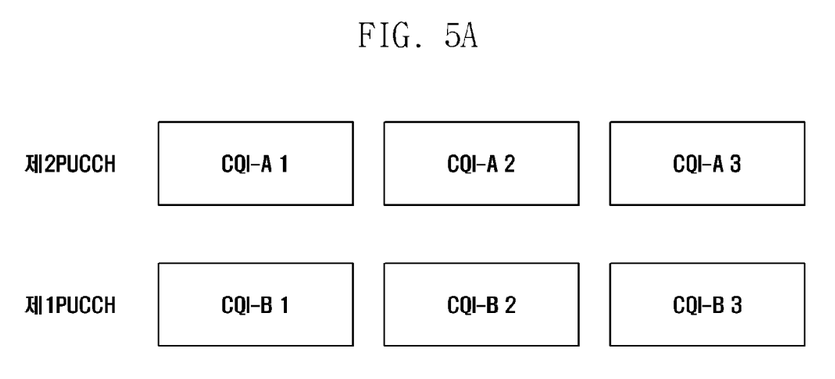
FIGS. 5a and 5b are diagrams illustrating an embodiment of transmitting control information through two channels to the BS by the MS according to an embodiment of the present invention.
Figure 5B:
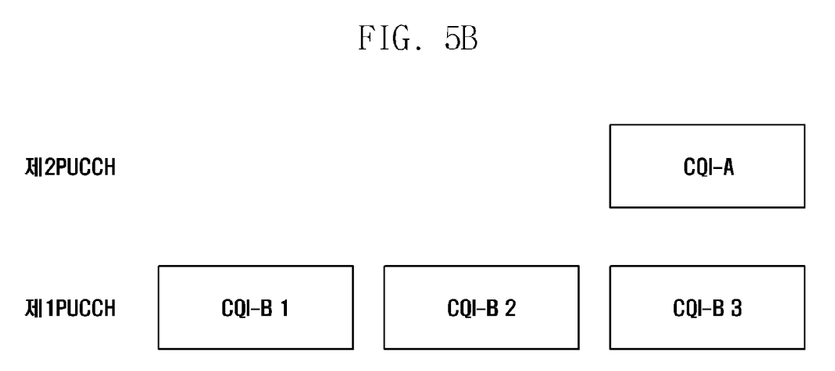

FIGS. 3, 4a to 4c illustrate examples of transmitting channel state information to the BS through one channel of a reverse link by the MS. However, channel state information of the first region and channel state information of the second region may be separately transmitted to at least two reverse link channels, respectively. FIGS. 5a and 5b are diagrams illustrating examples of transmitting channel state information through two channels. FIGS. 5a and 5b illustrate examples of a case of transmitting channel state information through two PUCCHs in an LTE system. FIG. 5a illustrates an example of a case where channel state information of a first region is transmitted each time channel state information of a second region is transmitted as shown in FIG. 3. What is different from FIG. 5a and FIG. 3 is that channel state information of the first region and channel state information of the second region are transmitted through PUCCHs of different reverse links.

FIG. 5b illustrates an example where channel state information of a second region is transmitted every subframe, channel state information of a first region and channel state information of a second region are transmitted every N-th subframe, and channel state information of the first region and the second region are transmitted through PUCCHs of different reverse links. Referring to FIG. 5b, it is understood that there is an independent channel of a reverse link transmitting channel state information of a first region, and the independent channel is transmitted in only one subframe for N subframes to which channel state information of the first region is transmitted but not transmitted ever subframe. FIG. 5b illustrates an example where N may be 3, channel state information of a first region is transmitted in a final subframe (third subframe) in units of three frames.

Although FIGS. 3, 4a to 4c, 5a and 5b illustrate an embodiment when channel state information is transmitted every subframe. That is, it may be easily extended that a subframe to which channel state information is not transmitted is inserted between subframes to which channel state information shown in FIGS. 3, 4a to 4c are transmitted.

In embodiments of FIGS. 3, 4a to 4c, 5a and 5b, a MS periodically reports channel state information of a control channel (first region) to a BS. The BS determines MCS and/or transmission power to be transmitted to the region based on the channel state information of the control channel. The BS determines MCS and transmission power of a data channel PDSCH based on channel state information of a data channel (second region) which is periodically transmitted. As described above, if the MS feedbacks an average of channel information of the data channel and a control channel instead of channel state information of the data channel, it may easily calculate channel state information of only the data channel based on the average and the channel state information of the control channel.

Embodiments of FIGS. 3, 4a to 4c, 5a, and 5b illustrates a case of periodically transmitting channel state information of a control channel. However, there may be many cases where a difference between the control channel and the data channel is not great. Accordingly, only when the BS instructs to transmit such a report method, if the report of the form is not used, only channel state information of a data channel (or average channel information of one subframe) may be transmitted. That is, only when the BS sets to report channel state information of a control channel, as illustrated in FIGS. 3, 4a to 4c, 5a and 5b, channel state information of the control channel may be periodically transmitted.

Embodiments of FIGS. 3, 4a to 4c, 5a and 5b illustrate a case of transmitting channel state information of a second region and channel state information of a first region. However, information according to a difference between a channel state of a first region and a channel state of a second region may be transmitted instead of the channel state of the first region. To measure the difference, the MS averages an input time for a predetermined time and performs filtering. A time required to measure and average the difference between channel states of the first region and the second region may be set to be longer than an average time for reporting the channel state of the second region. For instance, a channel state of the second region (data region) may be reported in every subframe of N subframes, and a channel state of a first region (control information region) may be reported in an N-th subframe. Accordingly, the channel state of the second region is measured for each subframe and the measured channel state of the second region is reported to the BS, and a difference between channel states of the first region and the second region may measure an average of N subframes (e.g., 10 to 100 subframes) or more and report the average to the BS.

However, a method implementing the embodiments may report a channel state of a control channel in real time, but it is necessary to design a channel format of a new form therefor. An amount of data transmitted for channel state information of an existing data region (or average channel information of subframe) may be reduced. Actually, in many cases, there are many cases where a difference between a channel state of a data region and a channel state of a control region is not frequently changed. For this case, the present invention suggests another method of reporting channel state information.

An embodiment of the present invention suggests that an MS transmits a channel discrepancy report to the BS. It is assumed in the embodiment of the present invention that the MS reports channel state information CQ B of a data channel (second region) to the BS with a predetermined interval. For example, it is assumed that the MS transmits channel state information of a data channel to the BS through a PUCCH every subframe. Instead of transmitting channel state information CQ B of a second region, channel state information CQ A of a first region may be transmitted with a predetermined interval. The present invention has illustrated based on a method of transmitting channel state information of the first region (control channel region) in addition to channel state information of the second region periodically transmitted.

If a difference between CQ A and CQ B is greater than a specific threshold (TH1), the MS reports the above event to the BS through a channel discrepancy report. The CQ A and the CQ B may report channel state information for a short time such as one subframe, but it is more efficient to report an average channel. In this case, a window of used time average may be about several hundred ms. Determining triggering the report may be achieved by comparing average channel state values rather than momentary channel state values. That is, an MS according to an embodiment of the present invention measures a channel state of a data channel during every subframe (1 ms) and transmits the measured channel state of the data channel through PUCCH, and measurement for a channel discrepancy (namely, channel state difference between first region and second region) report may be performed in units of the preset subframe number (e.g., 100 ms). As described above, the channel discrepancy report of the MS may be performed based on an average of CQ A and CQ B for a time longer than a period of transmitting channel state information of the data channel. The embodiment of the present invention has illustrated a state that a channel state report with respect to a data channel is continuously achieved through a PUCCH. However, when there is no channel state report, a downlink channel may be controlled through transmission of the channel discrepancy report. In this case, an example of types of messages configuring the channel discrepancy report is as follows. That is, when the MS transmits the channel discrepancy report to the BS, the channel discrepancy report may be generated by including at least one parameter among following parameters.

1) CQ A (channel state information of control channel (first region) or CQ B (channel state information of data channel (second region))

2) CQ A and CQ B

As described above, when channel measurement is achieved with a long time window for several hundred ms, it is more efficient in a system operation to simultaneously transmit CQ B (channel information of data region) values.

3) CQ A−CQ B or CQ B−CQ A (dB scale or liner scale)

If the dB scale is used, it is the same effect as informing a ratio of CQ A to CQ B.

4) If the value is quantized as one bit, it may be 1 bit indicator indicating whether CQ A>CQ B or CQ A<CQ B.

5) Transmission power for preference MCS level and/or control channel (first region)

When a different between CQ A and CQ B is changed by greater than a specific threshold (Th1) according to a time, the MS may inform the BS of the change through a channel discrepancy report. In this case, an event which the MS transmits the channel discrepancy report to the BS may include following disclose.

(1) When a difference between a channel state of the control channel (first region) and a channel state of a data channel (second region) is greater than a thirst threshold or is reduced to less than a second threshold (Th2), the MS may generate and report the channel discrepancy report to the BS. In this case, the first threshold Th1 and the second threshold Th2 may be set the same value or different values. To report a case where the difference exceeds a threshold or is less than the threshold, if thresholds for reporting the channel discrepancy report in a BS or standard are previously set and the specific conditions are satisfied, the MS may generate and report the channel discrepancy report to the BS. That is, when a plurality of thresholds are determined and the difference exceeds a boundary of the thresholds, the MS may report it to the BS. A difference of an entire possible channel states is divided into M sections and boundary values of respective sections may be set to thresholds. When a difference of receiving channels of the MS is changed from a reported section to another section, the MS may transmit the channel discrepancy report with respect thereto.

(2) When a difference between a channel state of the control channel and a channel state of the data channel is a third threshold Th2 greater than a finally reported value, the MS may generate and report the channel discrepancy report to the BS.

(3) When the channel state of the control channel is greater than a specific threshold value Th4 or less than a threshold Th5, the MS may generate and report the channel discrepancy report. A plurality of thresholds may be used as a reporting reference. That is, a possible channel state of a control channel is divided into a plurality of sections and a measured channel state of the control channel is changed from a previous section to another section, the MS may transmit the channel discrepancy report to the BS.

(4) If a preset time T0 elapses after finally transmitting the channel discrepancy report to the BS, the MS may generate and report the channel discrepancy report.

As described above, in addition to a method of aperiodically transmitting the channel discrepancy report according to an event, the MS may periodically transmit the channel discrepancy report to the BS every predetermined time.

As described above, a method of periodically transmitting a channel discrepancy report to a BS by an MS may the following methods.

(1) When transmitting data through uplink, a corresponding MS may piggyback and transmit a corresponding report to a data channel.

(2) The MS may periodically and aperiodically receive and transmit allocation of an uplink resource.

When the first method and the second method are used, a channel used in the LTE system is a PUSCH. When are data to be transmitted in a reverse direction, the first method adds the channel discrepancy report to the data and transmits the added data. The second method receives and transmits allocation of a PUSCH which will transmit the channel discrepancy report in a reverse direction. To do this, the BS may periodically engage a predetermined PUSCH resource for the MS. In this case, it is unnecessary to reverse transmission (Ul) grant from the BS. The MS may transmit a channel discrepancy report to a resource which the BS periodically engages. Each time an event to be reported occurs, the MS may perform a method of receiving allocation of a reverse resource from the BS and aperiodically reporting. In this case, it may be necessary to receive UL grant. To do this, the MS may request scheduling through uplink and receiving grant through a reverse link. The BS instructs to transmit the channel discrepancy report, the MS may transmit the channel discrepancy report. This is included in a case of receiving and transmitting allocation of an uplink resource.

(3) To regularly or irregularly CQI B, the channel discrepancy report may be periodically transmitted through an allocated channel. That is, it is assumed that there is a channel to be transmitted to report channel state information CQI B of the data channel (second region) by the MS. In this case, a CQI of a data channel is not transmitted to a location to which a CQI of the data channel is transmitted, and instead information of the channel discrepancy report may be transmitted. The methods may transmit information corresponding to the channel discrepancy report instead of a CQ A in examples of FIGS. 3, 4a to 4c, 5a and 5b. In this case, as a transmittable channel discrepancy report, an average of channel state information CQ A of an average control channel for a long time or different information CQ A–CQ B of channel states of an average control channel and a channel state of a data channel for a long time may be transmitted. Here, the long time refers to a time longer than a period of transmitting a CQ B through a PUCCH. For example, if a CQ B is transmitted through a PUCCH every 1 ms, CQ A–CQ B may be obtained as an average of about 100 ms period.

Figure 6:
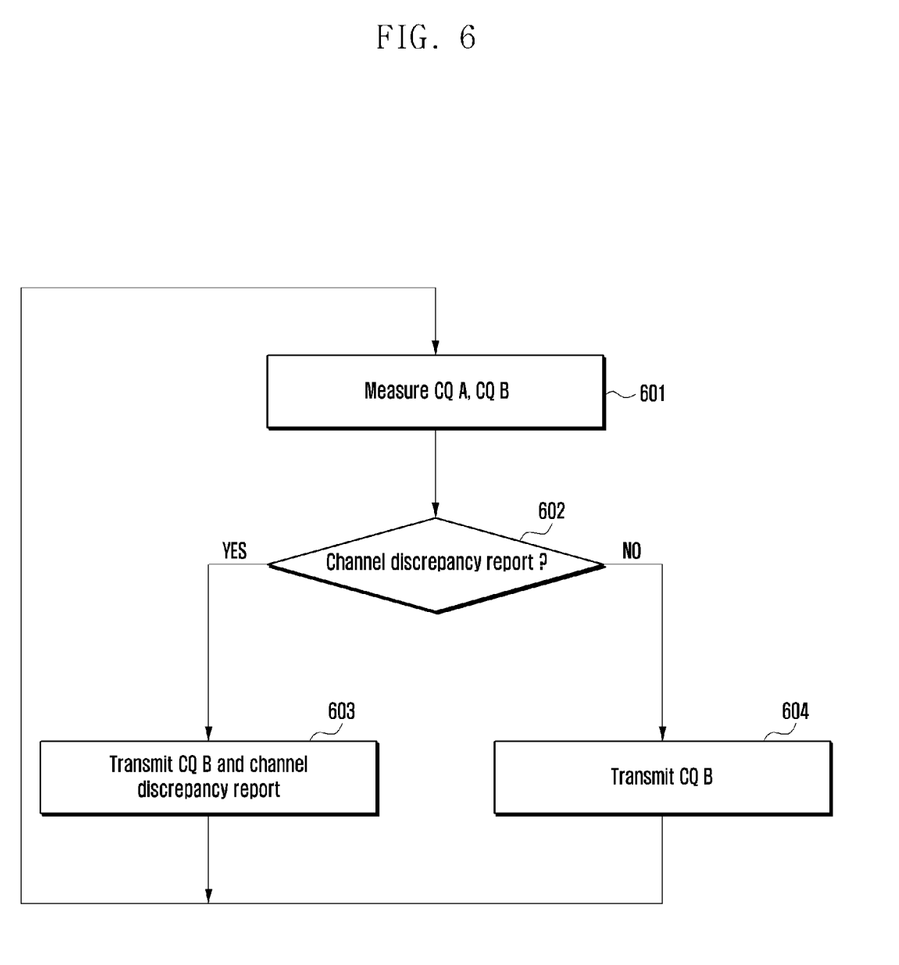
FIG. 6 is a flowchart illustrating a method of measuring CQIs by regions of downlink by the MS and reporting the measured CQIs by regions to the BS in a mobile communication system according to an embodiment of the present invention.

FIG. 6 is a flowchart illustrating a method of generating a channel discrepancy report by an event and transmitting the generated channel discrepancy report to the BS by the MS. It is assumed that in the embodiment of the present invention, the MS transmits the channel discrepancy report to the BS, as described above, the MS reports channel state information CQ B of a data channel (second region) to the BS with a predetermined interval.

Referring to FIG. 6, the MS measures CQ A and/or CQ B with a predetermined time interval (601). For example, the MS may measure channel states of the first region (control channel) and/or a channel state of a second region (data channel) for each subframe. The MS analyzes the measured CQ A and CQ B to determine whether a current state is a situation reporting the channel discrepancy report (602). In this case, a base determining presence of the occurrence of the channel discrepancy report may use the foregoing determination bases. When a difference between the measured CQ A and CQ B is increased or reduced greater than a preset threshold, when the difference between the measured CQ A and CQ B is a preset threshold greater than a reported value, when a channel state of the control channel is less or greater than a preset value, or when a preset time elapses after finally transmitting the channel discrepancy report to the BS, the MS may determine that a current state is a situation of generating the channel discrepancy report. In this case, the thresholds may the same value and may be set to different values.

If the channel discrepancy report must be transmitted, the MS detects the situation (602) and generates and transmits the channel discrepancy report (603). Simultaneously, the MS may separately transmit a CQ B (603). In this case, the channel discrepancy report may include at least one of parameters such as a value quantizing CQ A, CQ A and CQ B, CQ A–CQ B or CQ B–CQ A, CQ A–CQ B, 1 bit indicator, and transmission power for preference MSC level and/or control channel (first region).

When the MS generates the channel discrepancy report and reports the generated channel discrepancy report to the BS, the MS may transmit the channel discrepancy report through a reverse data channel and/or a reverse control channel. For example, the MS may transmit the channel discrepancy report (e.g., CQ A–CQ B values) averaged for a long time through a PUSCCH and transmit a moment CQ B to the PUCCH. The MS may transmit both of all the values (average CQ A, CQ B for long time) and moment CQ A and CQ B to the PUSCH. If a condition of transmitting the channel discrepancy report is not satisfied, the MS detects it (602), and reports only the CQ B (604). In this case, the MS may feedback the CQ B through the PUCCH.

An overview of an operation of a BS communicating with an MS performing the method of FIG. 6 will be given according to an embodiment of the present invention.

When not receiving the channel discrepancy report from the MS, the BS determines transmission power and/or MCS level of data transmitted through Region A and Region B using CQI B periodically or aperiodically reported from the MS as follows.

[TX PWR, MCS] for Region A=f(CQ A)
[TX PWR, MCS] for Region B=g(CQ B)

However, when receiving the channel discrepancy report from a corresponding MS, the BS estimates link quality (CQ A') of a first region (control information part) with reference to CQI B and channel discrepancy report contents, determines transmission power or an MCS level using the estimated link quality, and determines link quality (CQ B') corresponding to transmission power or MCS level of the second region. That is, as described above, the BS determines transmission power and/or a MCS level of the first region and the second region.

[TX PWR, MCS] for Region A=f(CQ A')
[TX PWR, MCS] for Region B=g(CQ B')

As described above, the BS determines transmission MCS and power of a control region with reference to the channel discrepancy report and a periodically transmitted CQI (channel information of data region). The BS may also determine transmission MCS and power of a data region (PDSCH of LTE).

After that, when receiving an additional channel discrepancy report from a corresponding MS, the BS may determined transmission power or MSC level of the first region and the second region with reference to the CQI B. A concrete method of determining data transmission power and MCS of a first region using link quality information reported from the MS by the BS may include following methods.

1) When CQ A−CQ B, CQ B−CQ A, CQ A/CQ B), or CQ B/CQ A are periodically or aperiodically reported as the channel discrepancy report, the BS estimates link quality of the first region (control information region) using CQI B and the channel discrepancy report. For instance, CQ A'=channel discrepancy value (average CQ A−CQ B for a long time)+ moment CQ B).

2) If a CQA is periodically or aperiodically reported as the channel discrepancy report (CQ A'=CQ A), the MS may require report of a considerably small frequency in the BS. In this case, the BS estimates link quality of the first region (control information region) using the CQ A.

3) When periodically or aperiodically transmitting 1 bit indicator to the channel discrepancy report, the BS having received one bit indicator to determining transmission power and MCS level, increases or reduces previously applied MCS level and transmission power to a specific level.

4) When receiving preference MCS level and/or transmission power for a first region, the BS applies preference MCS level and transmission power reported from the MS for transmitting data of the first region. A method of determining transmission power and MCS of each region may consider various requirements such as transmission MIMO mode, desired Frame error rate (FER), and characteristics of a user traffic.

Second, to regularly or irregularly transmit CQI B, it may be transmitted through an allocated channel. Embodiments thereof are described with reference to FIGS. 3, 4a to 4c, 5a and 5b.

Figure 7:
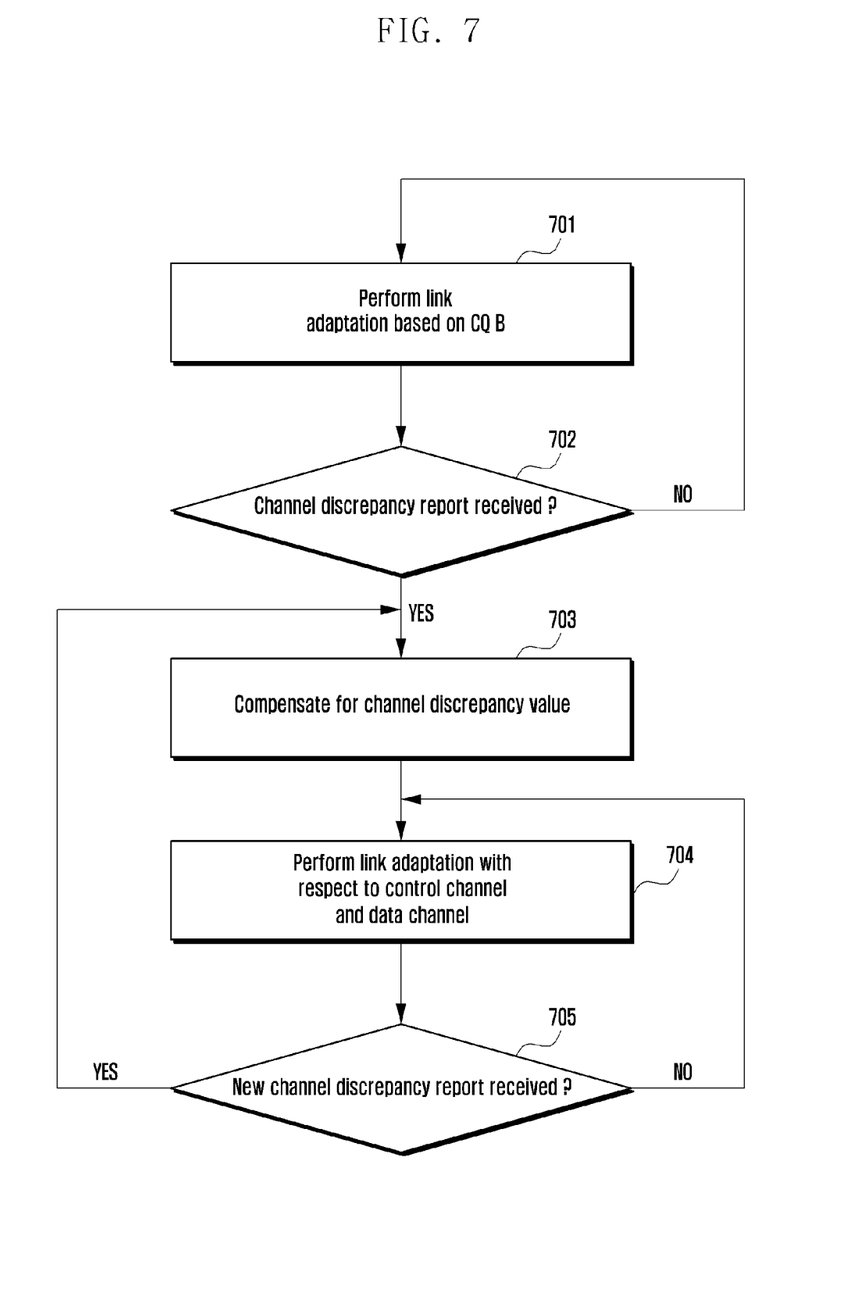
FIG. 7 is a flowchart illustrating a method of performing MCS adaptation and control of channels of downlink based on CQIs by regions which the MS reports by the BS in a mobile communication system according to an embodiment of the present invention.

FIG. 7 is a flowchart illustrating an operation of a BS according to an embodiment of the present invention.

Referring to FIG. 7, it is assumed that the BS receives a CQ B through a separate channel. In this procedure, a CQ B may be channel information of only a data region, or channel information of transmitted average forward link. A BS performs link adaptation based on only a CQ B which is channel state information of a data region (701). When not receiving the channel discrepancy report, the BS continuously perform link adaptation of step 701. However, when receiving the channel discrepancy report from the MS, the BS detects the received channel discrepancy report (702), and compensates for a channel discrepancy value (703). As a simple implementation example, the BS may discard a previous channel discrepancy value but use a new channel discrepancy value, and adopt averages of longer time as an accumulated channel discrepancy value. After that, the BS performs link adaptation of a control channel and a data channel based on the channel discrepancy value (704). In an embodiment of step 704, the BS may perform link adaptation with respect to the data channel based on a CQ B, and perform link adaption with respect to the control channel by compensating for the channel discrepancy value based on the CQ B.

When receiving the new channel discrepancy report, the BS detects the received new channel discrepancy value (705), updates the channel discrepancy value (703), and subsequently performs a link adaptation procedure of step 704. If the new channel discrepancy report is not received, the BS may continuously perform link adaptation with a channel discrepancy value of a previous state (704).

The present invention suggest various methods of transmitting the channel discrepancy report. However, a combination of at least two method is applicable. An embodiment of a combination of at least two method is described. It is assumed that an MS transmits only a CQ B to the BS for each subframe (or for N subframes, N is integer greater than 1) through a PUCCH when a general channel state is transmitted as an embodiment.

The following is an operation of the embodiment. An MS measures CQ A and CQ B for each subframe to continuously calculate a difference of a long time. If the difference is equal to or greater than a threshold Th1, the MS informs the BS of the difference through the channel discrepancy message. The BS having received the report changes a channel feedback scheme through a PUCCH. That is, the BS changes a transmission scheme of CQ A and CA B from a scheme of transmitting CQ B for each subframe to a scheme of FIGS. 3, 4a to 4c. That is, the BS changes the transmission scheme of CQ A and CA B to a scheme of periodically transmitting a channel discrepancy message through a PUCCH. In this case, the MS may report channel state information of a first region for a long time (e.g., 100 ms) or a discrepancy value (CQ A−CQ B, CQ B−CQ A, CQ A/CQ B or CQ B/CQ A, etc.) of channel states of the first and second regions for a long time to the CQ A. The MS does not periodically transmit a channel discrepancy report through a PUCCH but periodically engages the PUSCH to perform transmission. Simultaneously, the MS measures a channel difference of the first region and the second region. When the channel difference is less than another threshold, the MS informs the BS of it. The thresholds Th1 and Th2 may be set to the same value or different values. The BS having received the report changes a form of a report reporting a PUCCH to the MS to a form reporting only a CQ B. That is, the BS changes the form of the report to a mode transmitting the channel discrepancy message according to an event. The BS may inform an MS of a reporting scheme through a parameter different for each BS. The BS may set a reporting scheme different by users. Method of transmitting a control channel region (first region) or a channel discrepancy message to all MSs or a specific MS included in the cell by the BS may be differently set. For example, a difference between channel states of the control channel region and a data channel region does not occur, a specific cell may set such that a convention feedback method reporting only a channel state of the data channel region (second region) is used. When the difference between channel states of a control channel region and a data channel region is great, the BS instructs such that CQ A is transmitted in addition to CQ B or the BS may inform MSs such that a channel discrepancy message is transmitted if necessary.

Figure 8:
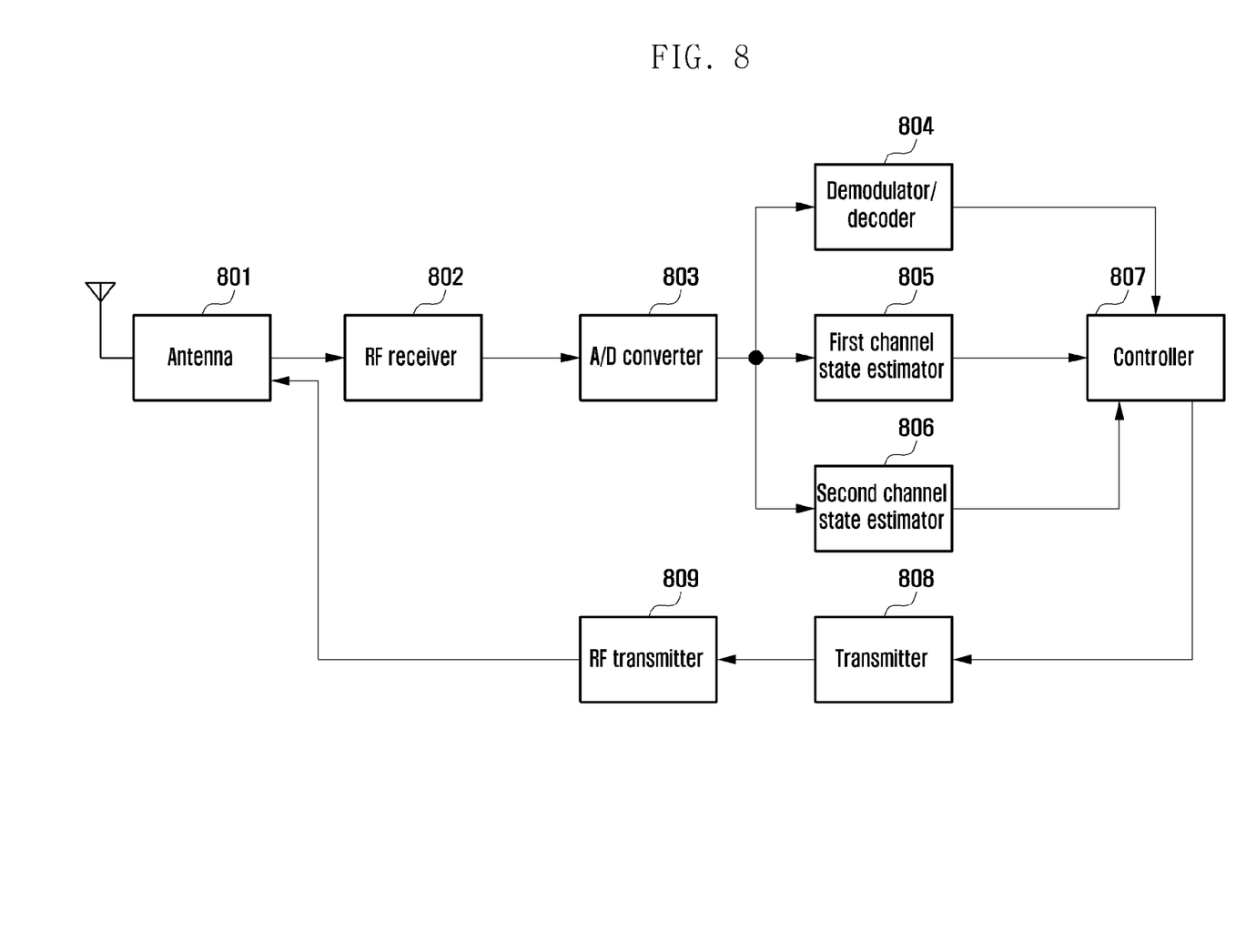
FIG. 8 is a block diagram illustrating a configuration of an MS of a mobile communication system according to an embodiment of the present invention.

FIG. 8 is a block diagram illustrating a configuration of an MS measuring a channel state according to an embodiment of the present invention.

Referring to FIG. 8, an MS receives a signal from a BS through an antenna 701, and an RF receiver 802 converts a frequency of the received signal into a signal of baseband or a low frequency band. An A/D converter 803 converts a signal of the RF receiver 802 into a digital signal. The digital signal outputted from the A/D converter 803 is applied to a baseband receiver and the baseband receiver processes the digital signal. The baseband receiver may include a demodulator/decoder 804, a first channel state estimator 805, and a second channel state estimator 806.

An overview of an operation of the baseband receiver will be described. The demodulator/decoder 804 demodulates and decodes data of a control channel and a data channel of a received baseband. A demodulator of the demodulator/decoder 804 includes channel demodulators for processing data of respective channels, and performs a function of demodulating data of a corresponding channel. Here, the same number of channel demodulators may be configured by the corresponding number of downlink channels. For instance, in a case of an LTE system, the channel demodulator may include a PDCCH demodulator and a PDSCH demodulator. The demodulated and decoded signal is transferred to the controller 807. The first channel state estimator 805 and the second channel state estimator 806 of the baseband receiver estimate channel states of corresponding downlink. In an embodiment of the present invention, the first channel state estimator 805 may estimate a channel state of a first region (control channel region), the second channel state estimator 806 may estimate a channel state of a second region (data channel region). The two estimated channel state information are transferred to the controller 807. In an LTE communication system of a communication system, the first channel state estimator 805 may estimate a channel state of a region to which a PDCCH being a control channel of the LTE system is transmitted, and the second channel state estimator 806 may estimate a channel state of a region to which a PDSCH being a data channel is transmitted. As in the LTE system, a first region to which control information is transmitted and a second region to which data are transmitted may be time-divided.

The controller 807 processes data outputted from the demodulator/decoder 804. The controller 807 generates feedback information for reverse direction transmission based on channel state information outputted from the first channel state estimator 805 and the second channel state estimator 806. The controller 807 analyses the channel state information received from the first channel state estimator 805 and the second channel state estimator 807 to determine whether a current state is a situation of reporting a channel discrepancy report. In this case, as described above, the determination base may be a case where a difference between channel states of the first region and the second region is equal to or greater than a preset threshold, a case where the difference between channel states of the first region and the second region is a preset threshold greater than a finally reported value, a case where a channel state of a control channel is less or greater than a specific threshold, or a case where a time finally transmitting the channel discrepancy report to the BS elapses greater than a preset time.

In this case, if a situation of transmitting a channel discrepancy report becomes, the controller 807 generates the discrepancy report, and transmits the discrepancy report through a control channel and/or a data channel of uplink. Here, the control channel may be a PUCCH, and the data channel may be a PUSCH. For example, the controller 807 may transmit a difference (one of CQ A−CQ B, CQ B−CQ A, CQ A/CQ B or CQ B/CQ A) of state information of the first region and the second region averaged for a long time through a PUSCCH as the channel discrepancy report and transmits a moment CQ B to the PUCCH. Another method may transmit all values (averaged CQ A, CQ B and moment CQ A, CQ B) to the PUSCH. If a condition transmitting the channel discrepancy report is not satisfied, the controller 807 reports only a CQ B, and may transmit the feedback using the PUCCH in this case.

The transmitter 808 may be configured by transmitters performing coding and modulation to transmit data of uplink. That is, the transmitter 808 may be configured by modulators/encoders corresponding to the number of uplink channels. For example, in a case of an LTE communication system, the transmitter 808 may include a PUCCH transmitter for transmitting control information to a BS and a PUSCH transmitter for transmitting data. In this case, the transmitter 808 performs a function of transmitting the channel discrepancy report from the controller 807 to the BS through a PUCCH and/or a PUSCH. A frequency of a signal outputted from the transmitter 808 is converted into a transmission band through the RF transmitter 809 and the converted signal is transmitted to the BS through an antenna 801.

Figure 9:
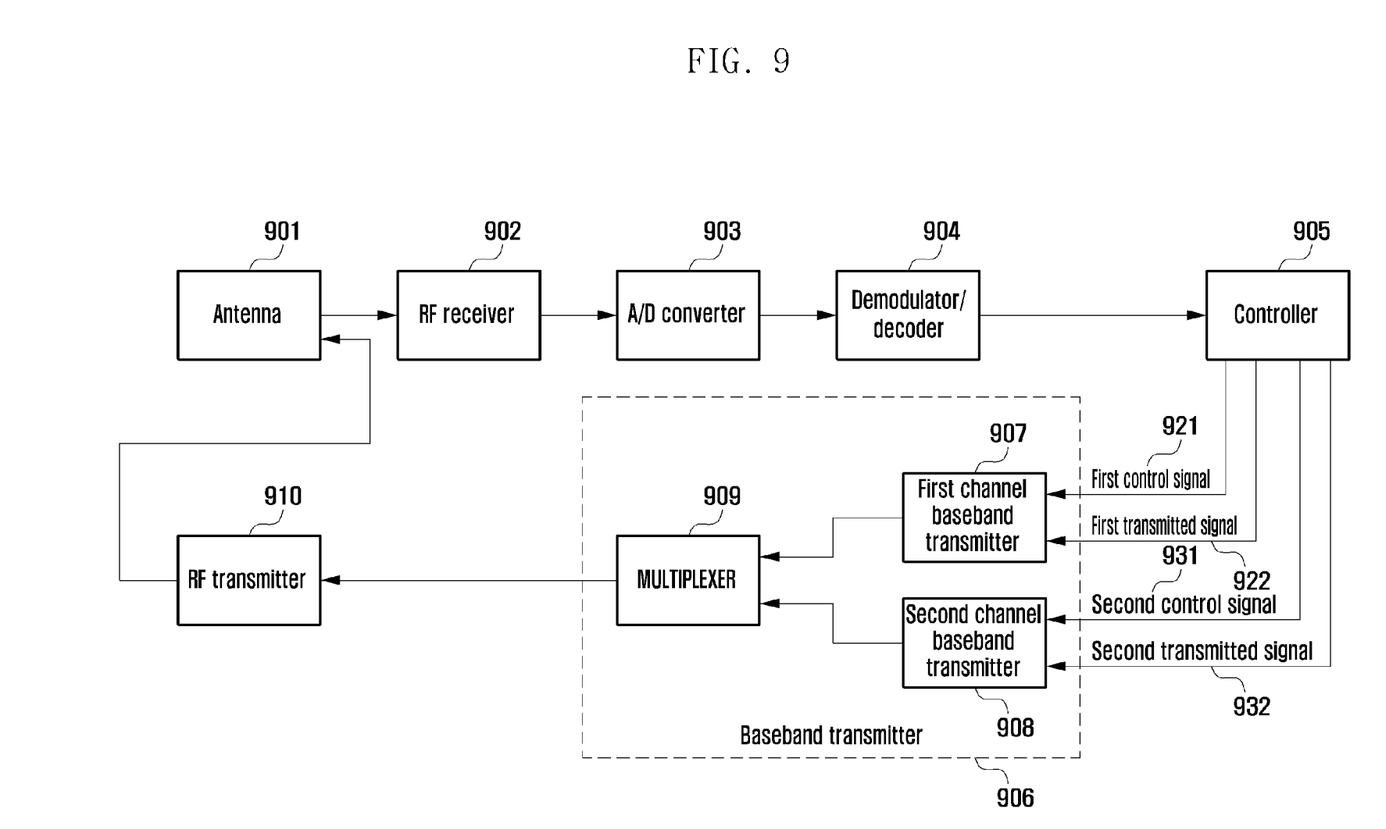
FIG. 9 is a block diagram of a BS of a mobile communication system according to an embodiment of the present invention.

FIG. 9 is a diagram illustrating a configuration of a BS performing MCS adaptation and power control of channels of downlink according to an embodiment of the present invention.

Referring to FIG. 9, the BS receives a signal transmitted in a reverse direction from the MS through an antenna 901. The RF receiver 902 converts a signal received through the antenna into a baseband signal or a signal of a low frequency similar to a baseband. An output of the RF receiver 902 is transferred to an A/D converter 903 and the A/D converter 903 converts the output of the RF receiver 902 into a digital signal. The demodulator/decoder 904 may be configured by the corresponding number of uplink channels, and each channel demodulator/decoder 904 demodulates and decodes corresponding signals of a control channel and a data channel from the converted digital signal, and provide the demodulated and decoded signals to the controller 905. Here, in a case of the LTE system, the demodulator/decoder 904 may include a PUCCH receiver processing control information and a PUSCH receiver processing data.

The control channel information may be information through the PUCCH channel, and the data channel information may be information transmitted to the PUSCH channel. As described above, channel state information with respect to two regions (first region and second region) according to an embodiment of the present invention may be transmitted to a PUCCH or a PUSCH. The channel information with respect to the first region may be transmitted to the PUSCH and channel information with respect to the second region may be a PUCCH and vice versa.

The controller 905 receives channel information of the first region and the second region transferred to the demodulator/decoder. The controller 905 determines MCS and/or transmission power with respect to respective channels (channel transmitted to the first region and channel transmitted to the second region) transmitted in downlink based on channel state information of the first region and the second region. In the embodiment of the present invention, a downlink channel transmitted to the first region may be a PDCCH, and downlink channel transmitted to the second region may be a PDSCH. First, if the channel discrepancy report is not received, the controller 905 determines transmission power and/or MCS level of the first region and the second region (data channel region) using channel information CQI B of the second region periodically or aperiodically reported. When the channel discrepancy report is received, the controller 905 estimates link quality of the first region with reference to CQI B and channel discrepancy report contents, determines transmission power and/or MCS level using the estimated link quality, and determines transmission power and/or MCS level of the second region with reference to corresponding link quality. Next, the controller 905 outputs the determined MCS and/or transmission power level information to the baseband transmitter 906.

The baseband transmitter 906 may include a first channel baseband transmitter 907, a second channel baseband transmitter 908, and a multiplexer 909. The first channel baseband transmitter 907 generates a baseband signal for transmitting to a first region (control channel region) channel. The second channel baseband transmitter 908 generates a baseband signal for transmitting to a second region (data channel region) channel. That is, in the embodiment of the present invention, the first channel may be a control channel transmitted to the first region, and the second channel may be a data channel transmitted to the second region. The first channel and the second channel may be time-divided and transmitted like PDCCH and PDSCH of an LTE system. The baseband transmitters 907 and 908 may receive two signals from the controller 905, respectively. One is a control signal including MCS and/or transmission power level of a channel to be transmitted as illustrated in reference numerals 921 and 931, and the other is data to be really transmitted as illustrated in reference numerals 922 and 932. Here, the first transmission data 922 may be control information to be transmitted through a PDCCH, and the second transmission data 932 may be data to be transmitted.

The baseband transmitter 907 and 908 generate a baseband signal to be transmitted to each channel based on MCS and/or transmission power from the controller 905 and data to be really transmitted. The embodiment of FIG. 9 has illustrated that transmission data inputted to the baseband transmitters 907 and 908 are applied from the controller 905. However, it is understood that a real system may directly receive the transmission data from a device other than the controller 905, namely, an application device (corresponding message generator). The transmitted signals of a baseband of the first channel and the channel are multiplexed by a multiplexer 209. The multiplexed signals of the first channel and the second channel from the multiplexer 909 are frequency-converted into signals of transmission band by the RF transmitter 910, and the converted signals are transmitted to the MS through the antenna 901. The embodiment of FIG. 9 has illustrated that a signal controlling transmission power of each channel among control signals of reference numerals 921 and 931 is applied to a baseband transmitter. However, as in a typical transmitter, a power control signal is also applied to the RF transmitter 910 such that transmission power of a transmitted signal may be controlled.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of controlling link adaptation of a terminal in a mobile communication system, the method comprising:
    measuring channel states of a first region and a second region of downlink, respectively, to generate channel state information of the first region and the second region of downlink;
    determining whether a channel discrepancy report occurs based on the channel state information of the first region and the second region of downlink;
    generating the channel discrepancy report including information on the difference between channel state information of the first region and the second region, if it is determined whether the channel discrepancy report occurs; and
    transmitting the channel state information including the channel discrepancy report to a base station through a preset uplink channel.

2. The method of claim 1, wherein the first region is a control channel region and the second region is a data channel region.

3. The method of claim 2, wherein the determining of whether the channel discrepancy report occurs comprises determining that the channel discrepancy report occurs:
    if a difference between the channel state information of the first region and the channel state information of the second region is equal to or greater than a preset threshold,
    if the difference between the channel state information of the first region and the channel state information of the second region is a preset threshold greater than a finally reported value,
    if a channel state information of the control channel is not in a preset threshold range, or
    if a time transmitting the channel discrepancy report to the base station elapses by greater than a preset time.

4. The method of claim 3, wherein the channel discrepancy report comprises at least one of:
    a dB scale or a linear scale according to the channel state difference between the first region and the second region, or
    a value quantizing the channel state difference between the first region and the second region, or preference MCS level and/or transmission power.

5. The method of claim 4, further comprising transmitting the measured channel state information of the second region if the channel discrepancy report does not occur.

6. The method of claim 5, wherein the transmitting of the channel state information comprises transmitting the channel discrepancy report through a data channel of uplink and transmitting the channel state information of the second region through a control channel of uplink.

7. A method of controlling link adaptation of a terminal in a mobile communication system, the method comprising:
    receiving channel state information from a terminal;

analyzing a channel discrepancy report including information on the difference between channel state information of the first region and the second region, and compensating for a channel discrepancy value to determine downlink quality of a first region and a second region if the channel discrepancy report is included in the received channel state information; and controlling transmission of a downlink channel corresponding to the determined downlink quality of the first region and the second region.

8. The method of claim 7, wherein determining of downlink quality of a first region and a second region comprises:

determining the downlink quality of the first region using a difference between the channel state information of the first region and the channel state information of the second region, and determining the downlink quality of the second region using channel state information of the second region, if the channel discrepancy report includes the difference between the channel state information of the first region and the channel state information of the second region and the channel state information of the second region.

9. The method of claim 8, wherein the first region is a control channel of downlink, and the second region is a data channel of the downlink.

10. The method of claim 9, further comprising determining downlink quality according to received channel state information of the second region if the channel discrepancy report is not included in the received channel state information.

11. An apparatus of controlling link adaptation of a terminal in a mobile communication system, the apparatus comprising:

a first channel state estimator configured to measure a channel state of a first region in downlink to generate channel state information of the first region;

a second channel state estimator configured to measure a channel state of a second region in the downlink to generate channel state information of the second region;

a controller configured:
to determine whether a channel discrepancy report occurs based on the channel state information of the first region and the second region of downlink, and
to generate the channel discrepancy report including information on the difference between channel state information of the first region and the second region, if it is determined whether the channel discrepancy report occurs; and a transmitter configured to transmit the channel state information including the channel discrepancy report to a base station through a preset uplink channel.

12. The apparatus of claim 11, wherein the controller is further configured to determine that the channel discrepancy report occurs:

if a difference between the channel state information of the first region and the channel state information of the second region is equal to or greater than a preset threshold, if the difference between the channel state information of the first region and the channel state information of the second region is a preset threshold greater than a finally reported value, if a channel state information of the control channel is not in a preset threshold range, or if a time transmitting the channel discrepancy report to the base station elapses by greater than a preset time.

13. The apparatus of claim 12, wherein the channel discrepancy report generated from the controller comprises at least one of:

a dB scale or a linear scale according to the difference between the channel state of the first region and the channel state of the second region, or a value quantizing the channel state difference between the first region and the second region, or preference MCS level and/or transmission power.

14. The apparatus of claim 13, wherein the controller is further configured to transmit the measured channel state information of the second region if the channel discrepancy report does not occur.

15. The apparatus of claim 14, wherein the first region is a downlink control channel, and the second region is a downlink data channel.

16. An apparatus of controlling link adaptation of a base station in a mobile communication system, the apparatus comprising:

a downlink receiver configured to receive channel state information from a terminal;

a controller configured:
to analyze a channel discrepancy report including information on the difference between channel state information of the first region and the second region, and
to compensate for a channel discrepancy value to determine downlink quality of a first region and a second region if a channel discrepancy report is included in the received channel state information; and a downlink transmitter configured to control transmission of a corresponding downlink channel according to the determined downlink quality of the first region and the second region.

17. The apparatus of claim 16, wherein the controller is further configured to:

determine the downlink quality of the first region using a difference of between the channel state information of the first region and the channel state information of the second region, and determine the downlink quality of the second region using channel state information of the second region, if the channel discrepancy report includes the difference between the channel state information of the first region and the channel state information of the second region and the channel state information of the second region.

18. The apparatus of claim 17, wherein the first region is a control channel of downlink, and the second region is a data channel of the downlink.

19. The apparatus of claim 18, wherein the controller is further configured to determine downlink quality according to received channel state information of the second region if the channel discrepancy report is not included in the received channel state information.

* * * * *